(12) United States Patent
Seppanen et al.

(10) Patent No.: US 7,752,020 B2
(45) Date of Patent: Jul. 6, 2010

(54) SYSTEM AND METHOD FOR MODELING CONSTRUCTION RISK USING LOCATION-BASED CONSTRUCTION PLANNING MODELS

(75) Inventors: Olli Pentti Petteri Seppanen, Palo Alto, CA (US); Ilkka Pentti Samuli Pelkonen, Helsinki (FI); Tim Marec Wessman, Helsinki (FI)

(73) Assignee: Vico Software Kft. (HU)

( * ) Notice: Subject to any disclaimer, the term of this patent is extended or adjusted under 35 U.S.C. 154(b) by 923 days.

(21) Appl. No.: 11/502,690

(22) Filed: Aug. 11, 2006

(65) Prior Publication Data
US 2008/0126025 A1 May 29, 2008

(51) Int. Cl.
*G06G 7/48* (2006.01)
(52) U.S. Cl. .......................................... 703/6
(58) Field of Classification Search ................ 703/6
See application file for complete search history.

(56) References Cited

U.S. PATENT DOCUMENTS

| | | | |
|---|---|---|---|
| 2002/0013704 A1* | 1/2002 | Finney | 704/246 |
| 2002/0194113 A1 | 12/2002 | Lof et al. | |
| 2003/0167265 A1* | 9/2003 | Corynen | 707/4 |
| 2003/0225605 A1* | 12/2003 | Yokota et al. | 705/7 |
| 2005/0197856 A1* | 9/2005 | Drucker | 705/1 |

OTHER PUBLICATIONS

I-Tung Yang et al. "Stochastic resource-constrained scheduling for repetitive construction projects with uncertain supply of resources and funding", available online Apr. 18, 2005, International Journal of Project Management, vol. 23, pp. 546-553.*
Jouko Kankainen and Olli Seppanen, "A line-of-balance based schedule planning and control system", 2003, 11th International Group for Lean Construction Conference, Virginia Tech, Virginia, 12 unnumbered pages.*
Iulian Trofin, "Impact of uncertainty on construction project performance using linear scheduling", 2004, University of Florida, pp. iii-xiii, 1-91.*
I-Tung Yang, "Stochastic analysis on project duration under the requirement of continuous resource utilization", Aug. 2002, Proceedings IGLC-10, Brazil, pp. 1-13.*

(Continued)

*Primary Examiner*—Paul L Rodriguez
*Assistant Examiner*—Russ Guill
(74) *Attorney, Agent, or Firm*—Jackson Walker L.L.P.; Christopher J. Rourk

(57) ABSTRACT

A method for modeling construction risk is provided. The method includes providing a statistical model for each of a plurality of location-based tasks of a construction project model. A model parameter is randomly selected for each of the plurality of statistical models to generate a statistically-based duration for each of the location-based tasks. A schedule duration is then calculated using the statistically-based durations of the location-based tasks, and the steps of providing, randomly selecting, and calculating are repeated until a statistical distribution for the construction project model is generated, such as using a Monte Carlo analysis procedure.

20 Claims, 9 Drawing Sheets

OTHER PUBLICATIONS

J.D. Lutz et al., abstract of Analyzing linear construction operations using simulation and line of balance, 1993, Transportation Research Board, pp. 1-3.*

Sema Nur Altug, "Risk management and post project evaluation processes for research and development projects", 2002, Sabanci University, pp. 1-101.*

Brenda McCabe, "Monte Carlo Simulation for Schedule Risks", 2003, Proceedings of the 2003 Winter Simulation Conference, pp. 1561-1565.*

Search Report and Written Opinion for corresponding PCT Application (PCT/US07/17828), mailed Nov. 18, 2008, 9 pgs.

* cited by examiner

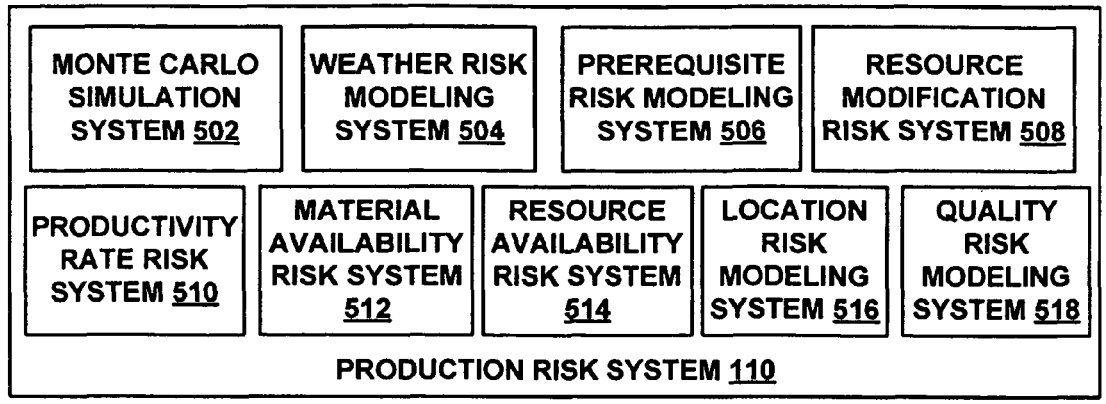
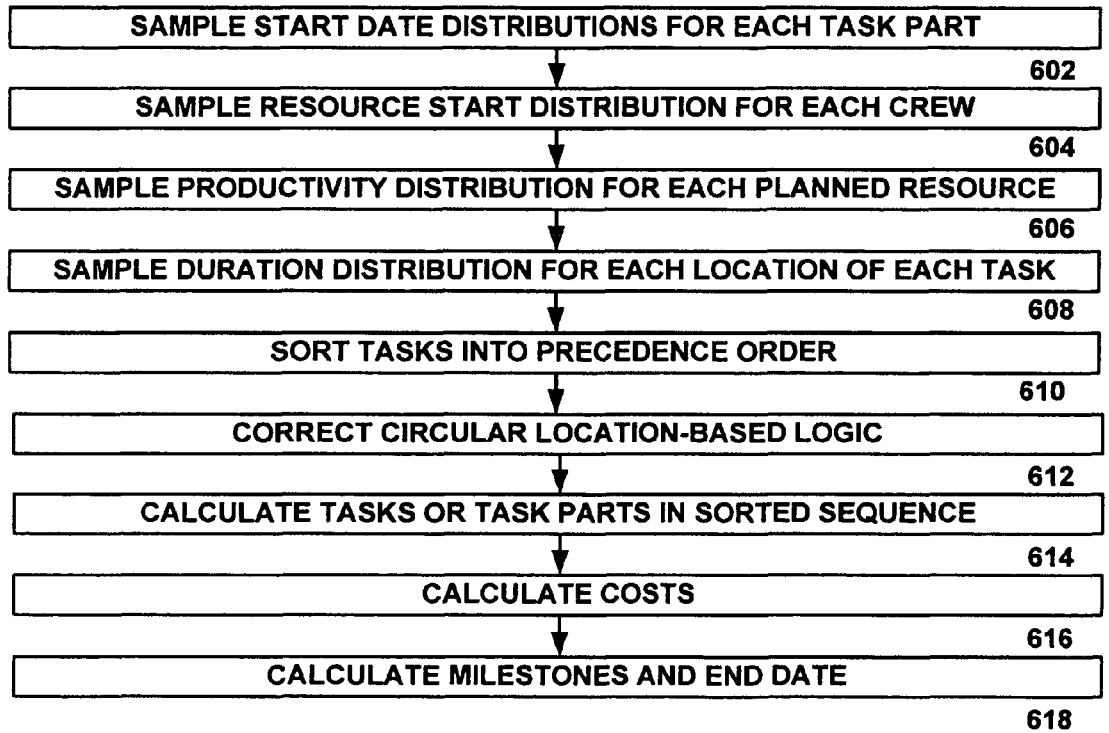

SYSTEM AND METHOD FOR MODELING CONSTRUCTION RISK USING LOCATION-BASED CONSTRUCTION PLANNING MODELS

FIELD OF THE INVENTION

The present invention pertains to the field of automated construction planning and scheduling, and more particularly to a system and method for modeling construction model risk in conjunction with location-based methodologies.

BACKGROUND OF THE INVENTION

Construction planning has typically been performed manually. To the extent that any construction planning processes can be automated, they have been limited to critical path method processes where the materials, resources, and other constraints for individual tasks are modeled. However, assignment of these tasks to locations within a construction project and coordination of the tasks has been performed manually.

For example, a construction project manager may seek to start each task as soon as possible, such that when a prerequisite task is completed, the next task is initiated. While this process makes intuitive sense, the result is often that different construction teams either wait for a preceding task to be completed, or are assembled as needed every time a task is completed. Such processes introduce additional cost and delay into the construction process, but the time required to manually determine whether tasks can be scheduled based on the location in which the tasks are performed is prohibitive, because of the many variables that are typically associated with each task. For example, whether or not detail work should be performed in an area may depend on whether there are additional floors above the area where activities are being performed that require support to be provided in the lower area that would ruin the detail. As a result, the difficulty in creating a methodology for accommodating such variables has resulted in such planning being done manually, resulting in wasted assets, delay and increased costs. Likewise, because of the limited functionality of such methods, the effect of continuity of work on risk modeling and the statistical modeling of productivity and resource availability has not even been contemplated.

SUMMARY OF THE INVENTION

In accordance with the present invention, a system and method for location-based planning are provided that overcome known problems with automating construction activity planning.

In particular, a system and method for location-based planning are provided that allows risk to be accurately modeled using probabilistic risk models for location-based task to reflect the probabilistic variation in task parameters.

A method for modeling construction risk is provided. The method includes providing a statistical model for each of a plurality of location-based tasks of a construction project model. A model parameter is randomly selected for each of the plurality of statistical models to generate a statistically-based duration for each of the location-based tasks. A schedule duration is then calculated using the statistically-based durations of the location-based tasks, and the steps of providing, randomly selecting, and calculating are repeated until a statistical distribution for the construction project model is generated, such as using a Monte Carlo analysis procedure.

The present invention provides many important technical advantages. One important technical advantage of the present invention is the coordination of location-based construction scheduling with risk assessment to provide more accurate models for construction risk of delay and cost. This is accomplished through the use of a layered approach that identifies individual construction tasks and the task parameters that are statistically variant, and by performing a Monte Carlo analysis that randomly assigns parameter values to the tasks and determines what effect such individual variations have on the entire model.

Those skilled in the art will further appreciate the advantages and superior features of the invention together with other important aspects thereof on reading the detailed description that follows in conjunction with the drawings.

BRIEF DESCRIPTION OF THE DRAWINGS

FIG. 5 is a diagram of a system for modeling production system risk in accordance with an exemplary embodiment of the present invention;

FIG. 6 is a flow chart of a method for performing a Monte Carlo simulation for modeling location-based construction planning model risks in accordance with an exemplary embodiment of the present invention; and FIGS. 7-16 are diagrams of exemplary embodiments of the invention.

DETAILED DESCRIPTION OF PREFERRED EMBODIMENTS

Figure 1:
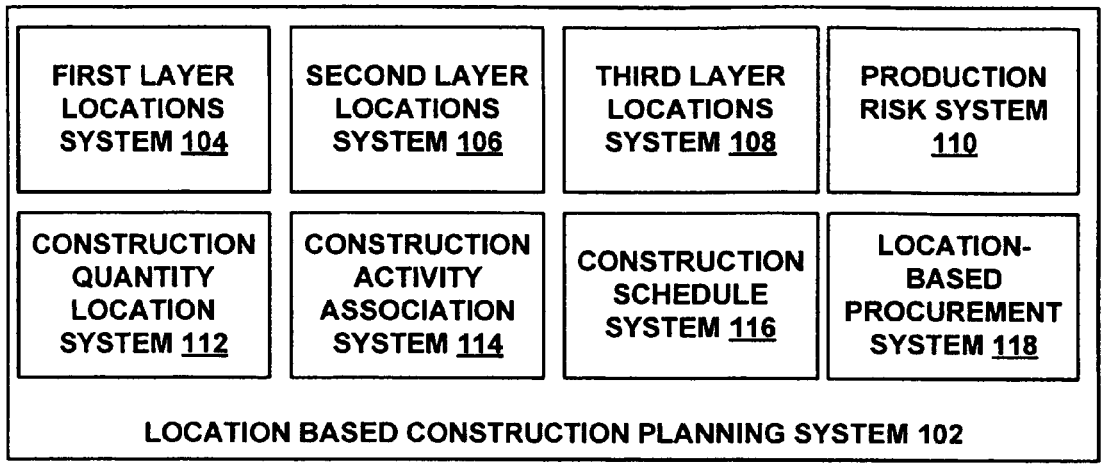
FIG. 1 is a diagram of a system for location-based construction planning in accordance with an exemplary embodiment of the present invention.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for location-based construction planning in accordance with an exemplary embodiment of the present invention. System 100 allows construction planning to be performed based on considerations of locations of construction tasks or activities, and can be used in conjunction with critical path method (CPM) construction planning processes or other suitable construction planning processes.

System 100 includes location-based construction planning system 102 and first layer locations system 104, second layer locations system 106, third layer locations system 108, production risk system 110, construction quantity location system 112, construction activity association system 114, construction schedule system 116, and location-based procurement system 118, each of which can be implemented in hardware, software, or a suitable combination of hardware and software, and which could be one or more software systems operating on a general purpose processing platform.

As used herein, a hardware system can include discrete semiconductor devices, an application-specific integrated circuit, a field programmable gate array, a general purpose processing platform, or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application.

Location-based construction planning system 102 uses the concept of location-based tasks to automate creation of CPM external logic to define the logic or connections between different activities within locations. Location-based tasks are collections of CPM-based activities that can be performed continuously by shifting start dates of location activities so that finish date of preceding location activity inside the task is always equal to start date of the succeeding location activity associated with the task. In this manner, these location-based tasks allow schedule creation to be automated and continuity to be optimized. Changing a property of a task can be used to affect all activities associated with the task. Unlike construction planning techniques that only use CPM logic, location-based planning also considers a location-based task's internal logic by allowing a planner to plan the location sequence and production rate to achieve continuous production. Thus, CPM logic can be applied within locations, and location-based flow logic can be applied between locations. A location-based task can contain one or more CPM activities, each of which can correspond with a physical location.

Activities correspond with single locations of a location-based task. Location-based tasks are collections of CPM activities and they can be continuously performed. Activities of a location-based tasks are generated by associating construction quantities with the task. A location activity is generated for each location where the quantities are positive. A location-based task can be continuously performed if the finish date of preceding CPM location activity is equal to the start date of succeeding CPM location activity, for all pairs of locations in the sequence of implementation.

In one exemplary embodiment, a task can contain work which can be done by a single crew, or split among multiple crews. Location-based construction planning system 102 identifies locations in a project using a location breakdown structure which has many properties in common with the more familiar work breakdown structure. Locations should be hierarchical so that a higher level location logically includes all lower level locations. In special projects, this correlation might not be straightforward. However, some general guidelines can be used that apply to commercial construction and that do not apply to special cases, such as linear infrastructure projects. These include that the highest level location hierarchies should consist of locations where it is possible to build the structure independently of other sections, for example, individual buildings or parts of large buildings. Likewise, the middle level should be defined so that a flow can be planned across middle level locations. For example, riser floors in a residential construction project where a floor is usually finished before moving to the next floor. Finally, the lowest level location should generally be small, such that only one trade can effectively work in the area, for example, apartments, individual retail spaces, and corridors. The lowest level location should be able to be accurately monitored, for example, the foreman must be able to assess whether or not the work is completed in that location.

Using this hierarchy, exemplary first layer locations system 104, second layer locations system 106, and third layer locations system 108 are provided with location-based construction planning system 102. Additional layer locations systems can also be provided where suitable. First layer locations system 104 generates one or more first locations where construction activities can be performed in parallel. Likewise, second layer locations system 106 generates one or more second layer locations where construction activities can be performed in parallel for one or more of the first locations. Second layer locations system 106 corresponds to a middle level as defined above. Likewise, third layer locations system 108 generates third layer locations where construction activities can be performed in parallel for one or more of the second layer locations. Third layer locations system 108 corresponds to the lowest level locations, as described above.

First layer locations systems 104, second layer locations system 106, third layer locations system 108, and any other suitable locations systems define the hierarchical relationship between the locations and interact with the remaining systems of a location-based construction planning system 102 so as to allow CPM external logic to define the lapin or connection between different tasks within locations, and also to consider a task's own internal logic by allowing the planner to plan the location sequence and production rate to achieve continuous production.

Production risk system 110 models construction project risk by the use of distributions and simulation. Scheduled tasks can have the following exemplary distributions:
crew specific start distribution
resource specific production rate distribution
prerequisite distributions (e.g. design, procurement)
weather risks (for weather prone tasks)
crews specific comeback delay if there are discontinuities
location risk (modeling risks related to particular locations)

Production risk system 100 can perform simulation procedures including sampling the distribution, such as simulating weather, simulating targeted start date for one or more crew, simulating one or more production prerequisites, simulating the production rate for one or more resource, and simulating location risks for one or more location. Next, the schedule can be built based on these simulated values. The locations can be sorted so that all predecessor locations are calculated before successor locations. The sort can be adjusted so that all locations of a task are processed before locations of any other task. The start date of the location can have a maximum such as a first crew start date, prerequisites, and dependencies. A duration of the location can also be provided, such as the quantity of man hours in the location divided by the sum of production rate factors of resources calculated daily depending on whether crews are available plus allocation risk factor. Finally, the finish date of the location can be determined using the maximum of the start date plus the duration plus weather delays and dependencies.

If a simulated start date of an X location is greater than the finished date of the last location, then accommodations must be made for resources to either wait for the finished or leave the site and return. If resources leave the site, comeback delay distribution is sampled for each crew and the resulting value is added to the start date. Finally, the results are recorded. The production system cost for labor and waste can be calculated, in addition to the overhead cost and interference (defined as all points where simulated start date of the next location of the same task are greater than the finished date of the last location of the same task). The results can be simulated then over multiple simulation rounds using the variables that are identified for weather, targeted start date for crews, simulated production prerequisites for starting a location, simulated production rates for resources, simulated location risks for locations, and other suitable variables.

Production risk system 110 also provides monitoring functionality for dynamic re-assessment of production risk. In one exemplary embodiment, monitoring interval data is modeled for each task, including deviation tolerance data that defines when a deviation from a planned task requires modification of a schedule. In this exemplary embodiment, the tolerance data can include production rate deviation data, total delay deviation data, or other suitable data. When the tolerance data for task is greater than the monitoring interval, detection occurs at the next monitoring interval. In addition, an implemented control action can be assigned to each task. In one exemplary embodiment, the implemented control action can be reduced to two alternatives such as adding resources or working overtime, in order to reduce computational complexity. Likewise, where a task is ahead of schedule, resources can be rescheduled to slower task to avoid schedule delay.

work that must be completed before a location is finished and the crew may continue to the next location. For example, a tiling task can include waterproofing and floor plastering work to be done with the same crew. Thus, a task's bill of quantities (BOQ) may include many items, even with different units, gathered into a single task where quantities of each of the items may vary from location to location.

After the location breakdown structure (LBS) is constructed, the quantities may be estimated by location. Actual planning begins with the project's BOQ and the first task of the planner is to lump related BOQ items into logical packages where the work can be done by same crew, has the same dependency logic outside of the package, and can be completely finished in one location before moving to the next location. It is also necessary to ensure quantities are available for all remaining tasks. This approach ensures that nothing of relevance is left out of the schedule and enables very powerful ways of both project control and handling change orders and claims.

The creation of BOQ can be demonstrated the following example. First, the LBS of the project is defined. In this example project, there are two buildings with four floors and a roof on each building.

| | | Project: | | | | Project | | | | | |
|---|---|---|---|---|---|---|---|---|---|---|---|
| | | Section: | | Building A | | | | Building B | | | |
| Code | Item | Floor: | 1 | 2 | 3 | 4 | Roof | 1 | 2 | 3 | 4 | Roof | Unit |

In this manner, the production risk for a project can be determined using objective data. Thus, the potential for a project to be finished early, late, for costs to be increased, or for other complications can be objectively modeled and analyzed prior to initiation of the projects.

Construction quantity location system 112 provides location-based quantities for construction activities as well as location-based relationships for construction activities. Quantities are an important aspect of the logic of location-based scheduling and in particular the internal logic of a task. The bill of quantities (measures) of a task defines explicitly all The LBS should be decided in advance, before the quantity surveyor measures, and the planner should participate in this stage.

| | | Project: | | | | Project | | | | | |
|---|---|---|---|---|---|---|---|---|---|---|---|
| | | Section: | | Building A | | | | Building B | | | |
| | | Floor: | 1 | 2 | 3 | 4 | Roof | 1 | 2 | 3 | 4 | Roof | |
| Code | Item | | | | Consumption man hours/unit | | | | | | | | Unit |
| 456100 | Erect plasterboard walls between apartments | 0.65 | 1 | | | | | | | | | M2 |
| 456226 | Mount 13 mm special gyproc paneling on plasterboard wall | 0.16 | 8.6 | 26 | 26 | 26 | | 31 | 35.4 | 35.4 | 35.4 | | M2 |
| 456216 | Mount 13 mm gyproc paneling on plasterboard wall | 0.16 | 8.6 | 26 | 26 | 26 | | 25.5 | 30 | 30 | 30 | | M2 |
| 456146 | Mount 79 mm paneling on dwelling room wall adjacent to sauna | 0.46 | 8.6 | 26 | 26 | 26 | | 25.5 | 30 | 30 | 30 | | M2 |
| 456136 | Mount 92 mm paneling on washroom wall | 0.46 | 10.7 | 22.5 | 22.5 | 22.5 | | 14.1 | 19.6 | 19.6 | 19.6 | | M2 |
| 456126 | Mount 79 mm paneling on washroom wall adjacent to sauna | 0.46 | 6.4 | 9.5 | 9.5 | 9.5 | | 3.1 | 6.2 | 6.2 | 6.2 | | M2 |
| 456116 | Mount 92 mm paneling on dwelling room wall | 0.46 | 57.4 | 118.6 | 118.6 | 118.6 | | 109.8 | 134.3 | 134.3 | 134.3 | | M2 |

For an individual task, the BOQ may look like the preceding table. The plasterboard wall task includes different kinds of walls that can be done with the same plasterboard crew. There are quantities in all locations except the roof. The quantities are generally larger in building two than in building one and the smallest quantities are in the first floor.

Construction quantity location system 112 uses the quantities to generate CPM location activities of a location-based task. A location activity is generated for each location where the quantities are positive. In the above example, location-based task "Plasterboard walls" would have locations Building A: floors 1, 2, 3 and 4 and Building B floors 1, 2, 3, 4. It may not have a location activity on the roof because all quantities on the roof are zero. The consumption column and the calculations are described below.

Construction quantity location system 112 calculates the duration of each location activity by considering quantity of the location, labor consumption associated with the quantity and resources of the location-based task. Total man-hours needed to complete a location is equal to resource consumption times quantity summed over all quantity items in the location. Duration (in hours) in a location is the total man-hours in the location divided by amount of workers. This duration can be changed to be days by dividing by workday length.

Figures 7, 8:
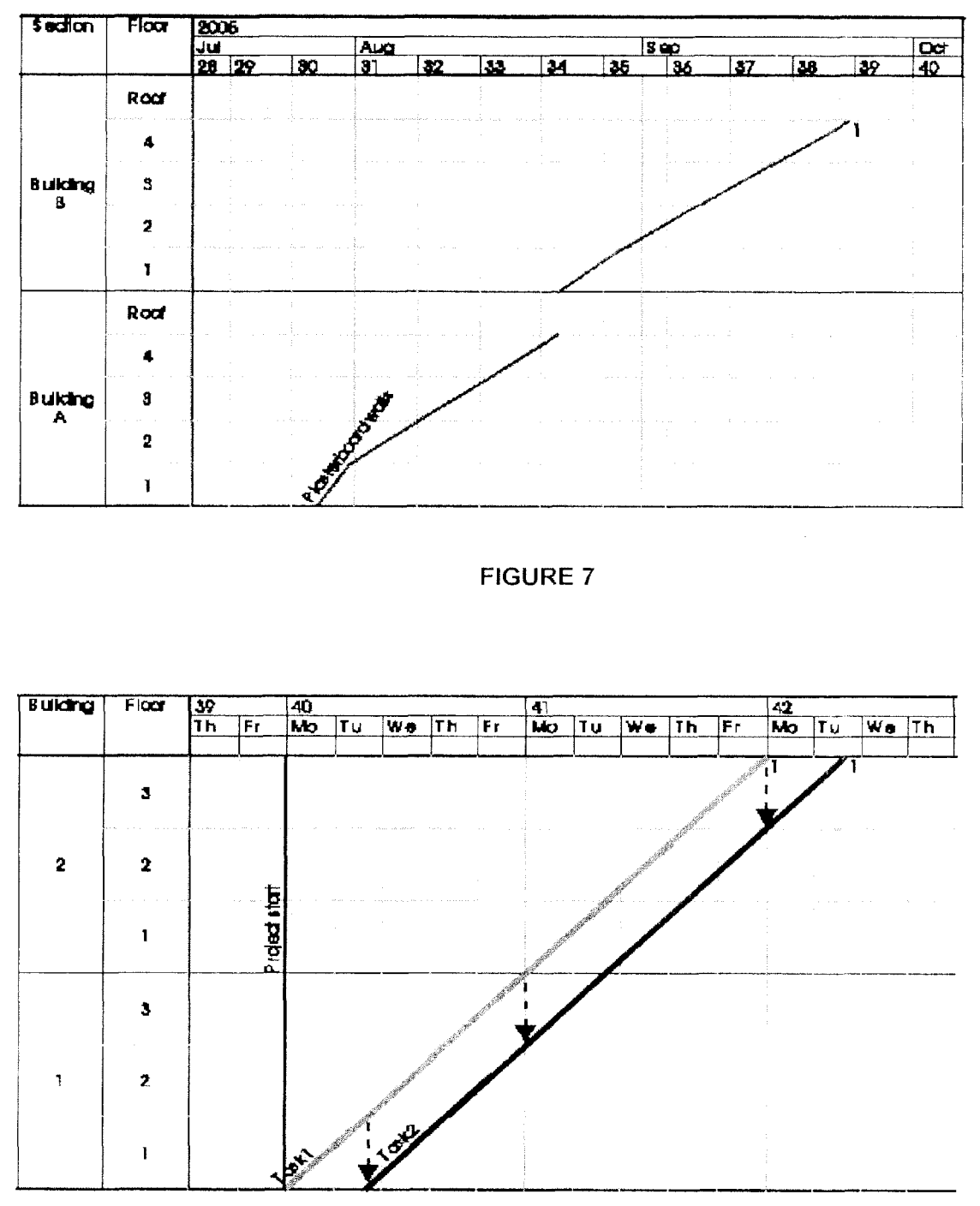

The quantities result in the flow line in FIG. 7, where it is visible that there is no work being done on the roofs of either building because quantities in these locations are zero. It also takes a noticeably shorter time to finish the first floor and the slope becomes gentler in the second building because of the larger quantities.

A location-based BOQ strengthens the planning process when using location-based planning. If the quantities change or there is a variation (such as a change order or due to risk assessment), the schedule can be updated by changing the quantity. Durations and location activities can then be updated automatically.

Because resources and productivities are properties of location-based tasks, changing productivity or resources of a location-based task automatically updates all the location activities.

The external logic of location-based tasks controls the links between activities or tasks within locations. In location-based logic, it is assumed that in each location the logic between separate tasks is similar. This simplifies the complexity as it is only necessary to create a link between two location-based tasks, which is then copied to each individual CPM location activity in a location. Thus, it is possible to consider a generic logic network defining a relationship between activities in any location. A logical connection created between two tasks is therefore automatically created and replicated for each location, regardless of relationships existing between locations. This is the primary logic layer and is equivalent to traditional CPM logic. CPM calculations can be used but the logic network is automatically generated based on the location-based tasks.

FIG. 8 represents two tasks which occur on every floor of two buildings. There is a layer 1 finish start link between the activities, such that task 1 must be finished on any floor before task 2 can commence on the same floor.

Construction activity association system 114 provides for internal dependency logic between locations within tasks. These dependencies are used to achieve the flow of resources in uninterrupted work, to model risk, and for other suitable purposes. This is the internal logic within the task but between location activities. Unless deliberate decisions are made to the contrary, using multiple work crews, it may be assumed that work flows between locations sequentially with finish-to-start links. Thus, even though external CPM logic may allow work to commence early, the work cannot proceed until the resources are released according to the internal task logic.

Internal logic of a location-based task means that each task can have an internal location sequence that describes the sequence in which the locations will be completed for that task. The sequence for each task is independent of other tasks or any sequence for the project. This planning decision can be made when scheduling projects.

Figure 9:
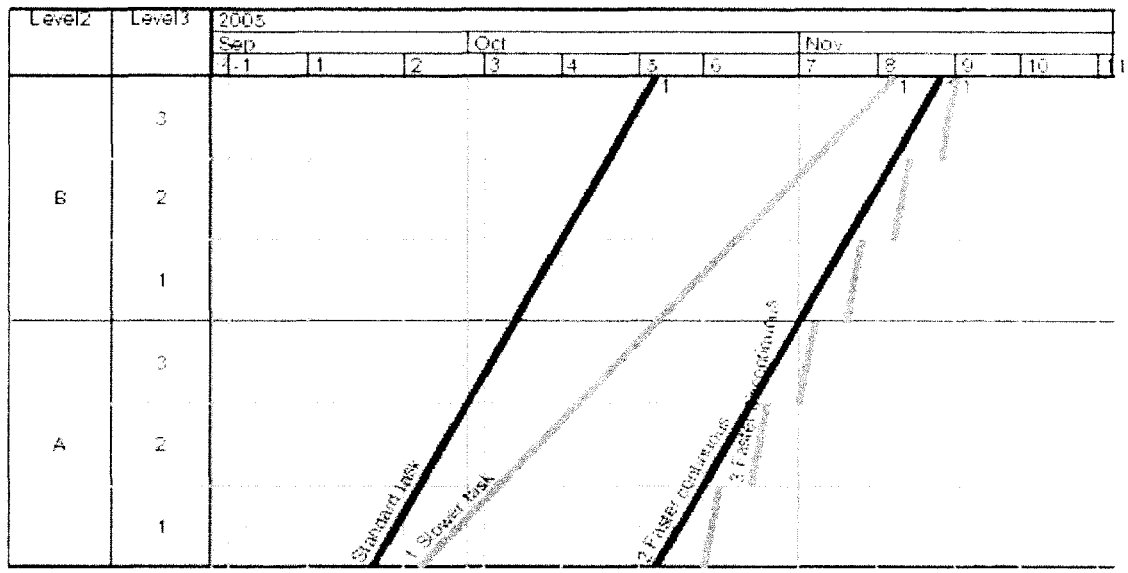

Internal logic enables sequential work, however, external logic can cause interruption in the flow of work if the succeeding task is quicker than the preceding task. There are three special cases: slower continuous work, faster discontinuous work, and faster continuous work.

Where the succeeding task is slower than its predecessor in FIG. 9, the task starts as early as possible and gradually gets further behind the preceding task (task 1—slower task in the above figure). Likewise, where the succeeding task is faster than its predecessor but is to remain continuous the task start date is delayed until the work may complete as early as possible and will remain continuous (task 2—faster continuous in the above figure). Finally where the succeeding task is faster than its predecessor and is allowed to be discontinuous, the tasks start as early as possible in each location (task 3—faster discontinuous in the above figure). This is the way most site managers react with faster tasks, but may be less efficient.

The third layer of internal logic provides standard CPM links to other locations for the same task while the first layer provides the links to other tasks within the same location. The CPM calculations can be used directly in the forward pass if everything starts as soon as possible, which is a requirement of CPM. However, third layer internal logic allows for faster work to be forced to be continuous, as the alternative will, in most cases, cost more money and cause disturbance on a site due to discontinuous work. Continuity of location-based tasks means that all its location activities are performed in sequence without breaks in between (i.e. finish date of preceding location=start date of succeeding location). In order to accomplish this for selected tasks the start date of latter locations will be used to pull the start dates of earlier locations so that continuity can be achieved.

Figure 10:
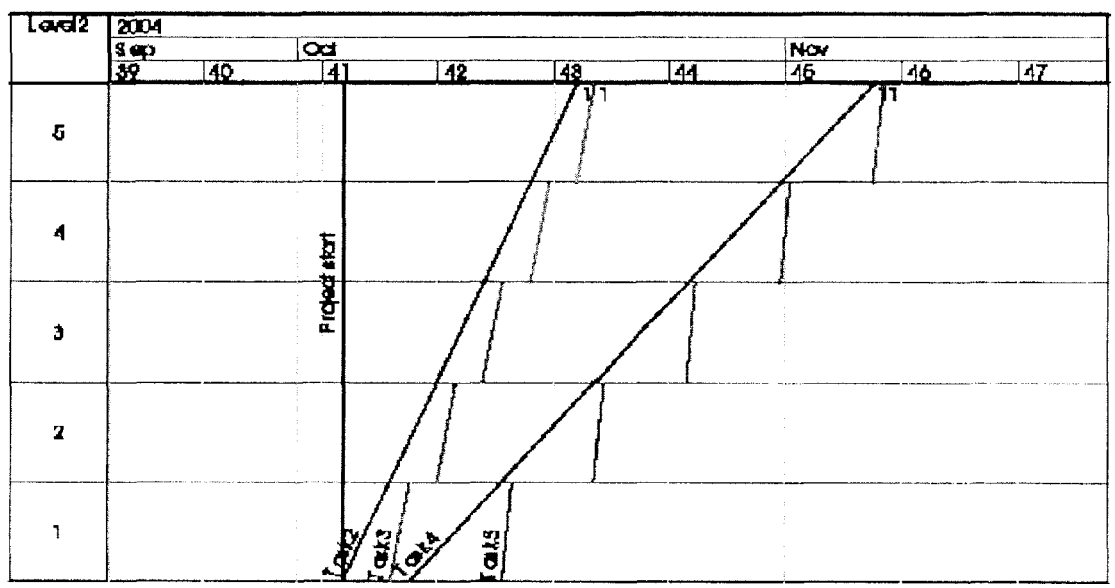

For example, a project with five floors and four tasks with finish to start links between tasks in each location is shown in FIG. 10. Task 3 is faster than task 2 in each location so there is a break of flow of one day on each floor. Task 5 is faster than task 4 and its flow is broken for four days on each floor. This means the workers of tasks 3 and 5 will have to slow down or they will run out of work (and probably leave the site). Note the in time of CPM solution (Friday week 45).

Flow-oriented planning allows tasks to be continuous, even where it delays the start dates of overly fast tasks. Third layer location-based scheduling logic allows the user to choose the task which would be done continuously and the tasks where the flow can be broken.

Figure 11:
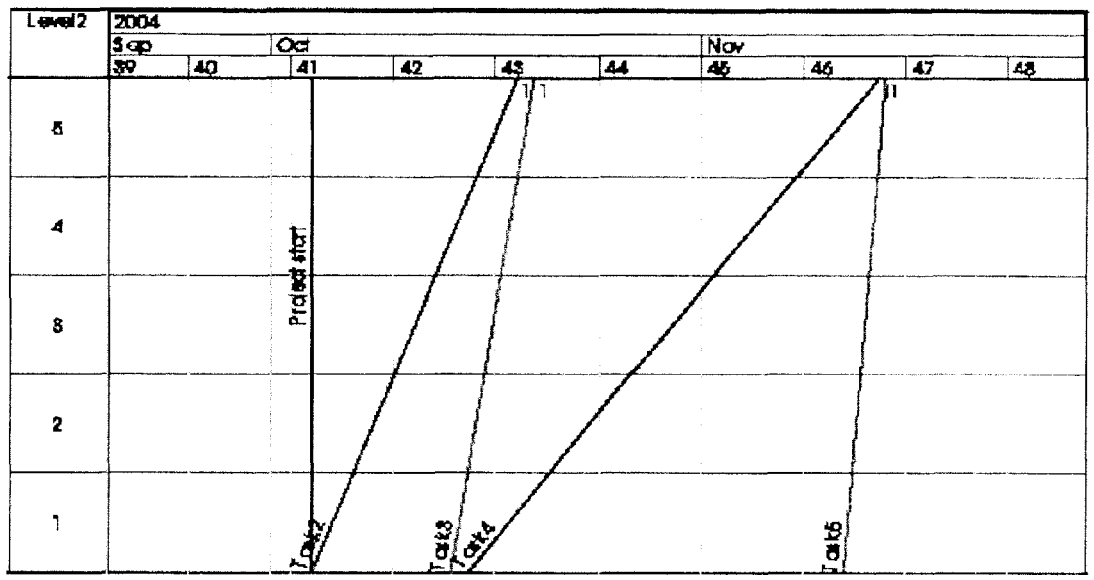

FIG. 11 shows the same example where all the tasks have been forced to be continuous so that start dates of faster activities have been pulled to a later time. The end time has jumped one week to the Friday of week 46. However this schedule has less risk and saves costs due to the continuity of production. There is still room for improvement because it would be possible to save time by adding resources to bottleneck tasks or removing them from overly fast tasks.

Construction schedule system 116 interfaces with first layer locations system 104, second layer locations system 106, third layer locations system 108, production risk system 110, construction quantity location system 112, and construction activity association system 114, as well as potentially with location-based procurement system 118 to generate the construction schedule. In one exemplary embodiment, construction schedule system 116 can generate construction schedules based on variable parameters that are modified so as to determine the effect of having crews wait on site, having crews leave, to accommodate for risks caused by weather or delay, or to otherwise generate comparative construction schedules to determine optimal construction scheduling. In this manner, construction schedules that accommodate location-based variables can be readily generated for comparison and determination of optimal construction scheduling.

Location-based procurement system 118 includes procurement tasks that are composed of quantity items (resources and/or methods). The same quantities are used as for schedule tasks and can provide a connection between schedule tasks and procurement tasks. A procurement task can be work or material that is procured from the same supplier as one delivery contract or subcontract.

Procurement task properties can include quantities, suppliers, floor person, and procurement events, such as things that have to be done first before delivery, or an event that has a name and delay before the succeeding event. The last event is usually delivery for a procurement task.

Procurement task calculations can be performed for work and material need times for each quantity item. Each quantity item can belong to one schedule task and one procurement task. The need time can be taken from the scheduled start date of the scheduled task of that quantity for each location. Scheduled tasks linked to the procurement task can have as one of their properties a hierarchy level of delivery, such as by creating a delivery that contains all of the quantities needed by a single or multiple locations of a schedule task. The hierarchy level of deliveries can be greater than the hierarchy level of quantities. For example, deliveries may be planned using first level locations even if quantities have been estimated for second level locations. The suggested delivery date can be the minimum need time of included quantities, including delivery delay. If multiple deliveries would happen on the same day, they can also be lumped together as the same delivery. Procurement event need times can be calculated for each event. If the need time precedes the event, the procurement time will be an event lag. If the event doesn't have a preceding event, first suggested delivery is used as a preceding event. The target cost is the total cost of quantities included.

System 100 can provide for location-based construction planning that allows location of tasks to be included in construction scheduling. Location-based construction planning system 102 allows tasks to be coordinated based on task dependencies, allows risks affecting task parameters such as productivity, start date, or completion date to be modeled, and task location of dependencies and other variables to be modeled that can affect the ability to accurately schedule construction project.

Figure 2:
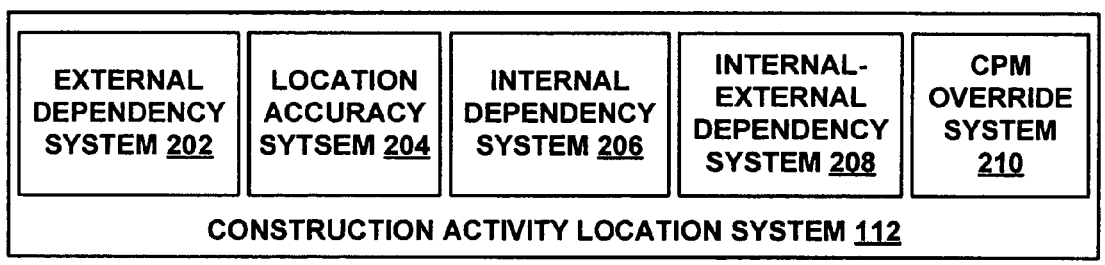
FIG. 2 is a diagram of a system for construction activity location coordination in accordance with an exemplary embodiment of the present invention.

FIG. 2 is a diagram of a system 200 for construction activity location coordination in accordance with an exemplary embodiment of the present invention. System 200 includes construction quantity location system 112 and external dependency system 202, location accuracy system 204, and internal dependency system 206, internal-external dependency system 208 and CPM override system 210, each of which can be implemented in hardware, software, or a suitable combination of hardware and software, and which can be one or more software systems operating on a general purpose processing platform.

External dependency system 202 identifies the external logic of location-based tasks and controls the links between location activities or tasks within locations, including risk-modified links. In location-based logic it is assumed that in each location the logic between separate tasks is similar. This greatly simplifies the complexity, as it is only necessary to create a link between two location-based tasks, which is then copied to each individual CPM activity in a location. Thus it is possible to consider a generic logic network defining the relationships between activities in any location. The logical connection created between two tasks is therefore automatically created and replicated for each location, regardless of relationships existing between locations. This is the primary logic layer and is equivalent to traditional CPM logic and the calculations are the same as in CPM but they are automatically replicated for each location.

In one exemplary embodiment, external links to other scheduled tasks can be standard critical path method links such as finish-start links, start-start links, start-finish links, and finish-finish links, that are copied to each location. In one exemplary embodiment, the location-based links can start after the preceding task has proceeded two floors above the succeeding task. In this manner, external dependencies such as may be imposed on a location-based task can be accounted for. In another exemplary embodiment, probabilistic models for risks due to weather, availability of materials or resources, quality or other factors can be modeled, such as were such risks affect parameters such as productivity, start date, completion date or other suitable parameters.

Location accuracy system 204 provides external higher level logical relationships between activities driven by different levels of accuracy. In order to layer CPM logic or task relationships at different levels of accuracy, each location-based task must be allocated an accuracy level that corresponds to a hierarchy level in the location breakdown structure. The accuracy level means the lowest level of a location that is relevant to the task. For example, the natural accuracy level for structure would be floor or pour, depending on the project, because the structure is raised sequentially by floor. The natural accuracy level for finishes can be the individual apartment or even a room.

Figure 12:
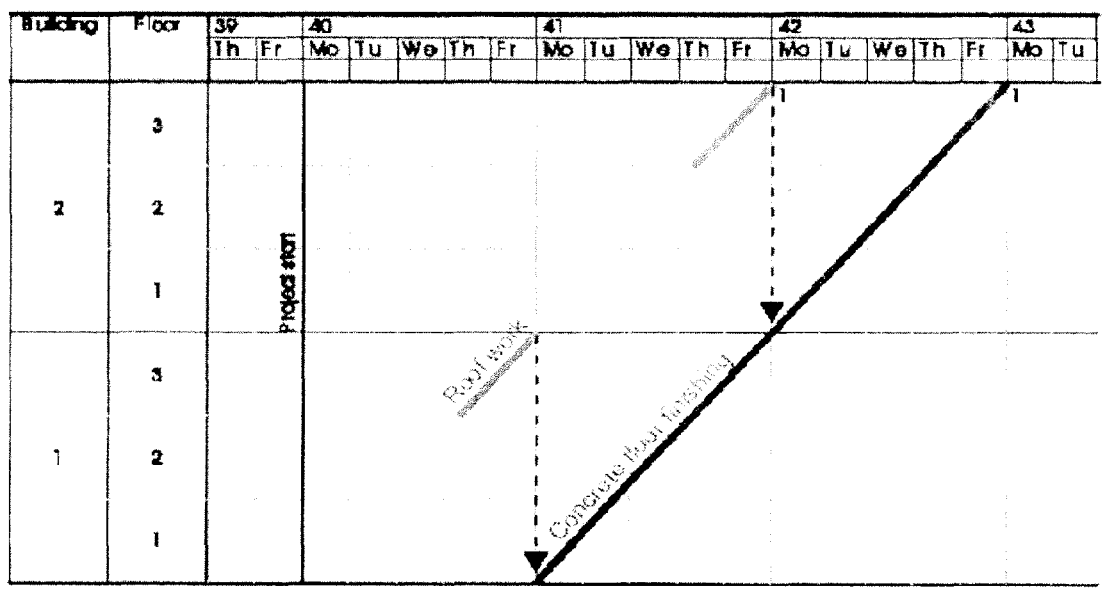

Just as tasks have a location-based accuracy level, similarly, each link between tasks has an accuracy level. This link can be defined at a suitable level of accuracy which is the same or rougher (higher) as the highest accuracy level of the two location-based tasks. For example, as shown in FIG. 12, if roof work and concrete floor finishing work both have the floor level accuracy, setting the accuracy level of the lick between the tasks to building would mean that the roof must be finished in a building before the concrete floor finishing work can start in the same building.

Internal dependency system 206 defines the internal dependency logic between locations within tasks. This logic layer allows the achievement of flow of resources and uninterrupted work. This is the internal logic within a task between locations.

Unless decisions to the contrary are made, using multiple work crews, it may be assumed that work flows between locations sequentially with finish to start links. Thus, even though the external CPM logic may allow work to commence early, the work cannot proceed until the resources are released according to the internal task logic. It is not that internal logic takes precedence, but rather that both must apply.

In addition, the task has an internal location sequence that describes the sequence in which the locations will be completed for that task. The sequence for each task is independent of other tasks or any perceived sequence for the project, and this is one of the important planning decisions to be made when scheduling projects.

Figure 13:
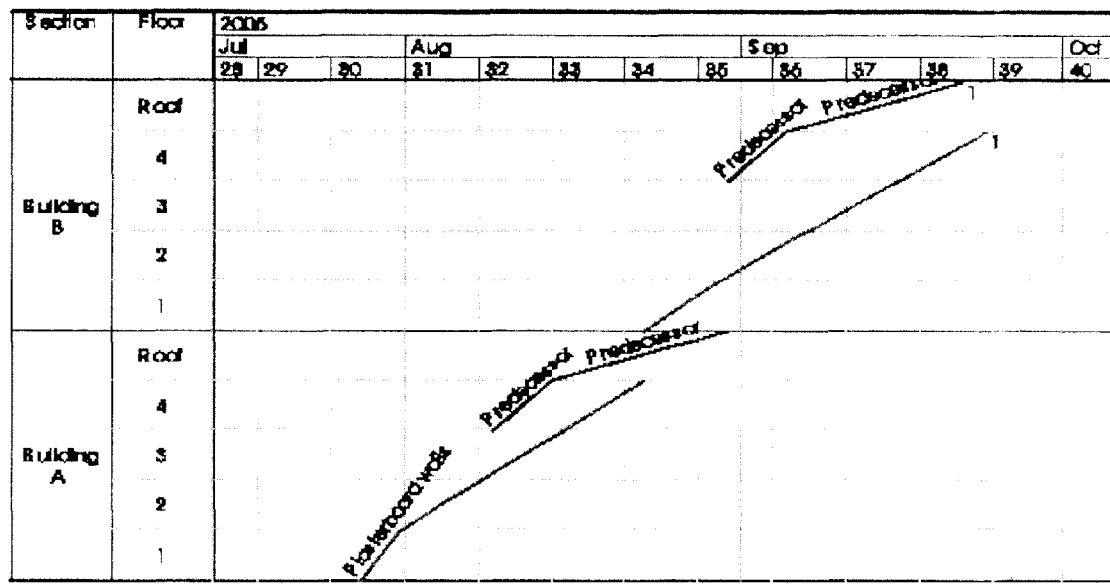

In one exemplary embodiment, a task is created that is done only on fourth floor and the roof of buildings A and B. In FIG. 13, the predecessor to the plasterboard task appears to flow through the plasterboard task where there is no plasterboard (on the roof). The plasterboard wall must be done after the task predecessor on each level where (and only where) both tasks exist. This can be used to optimize the sequence of work.

It should also be noted that lags and buffers are not an additional layer of logic, as they belong to all dependency relationships, as they can be an important part of the layered logic of the location-based system. Lags are a well-known component of CPM logic and need little explanation. Buffers, on the other hand, are a novel concept. A lag is the required fixed duration of a logical connection between two activities or tasks. In contrast, a buffer is the absorbable allowance for disturbance between adjacent tasks or locations and is component of the logical connection between two tasks.

Buffers appear to be very similar to the lags except that they are there to protect the schedule and/or intended to absorb minor variations in production. The continuous flow of work needs to be protected. Therefore each dependency link has an additional attribute, a buffer. A buffer functions technically exactly the same way that a lag of the dependency does, however it is used only when calculating the forward and backward passes of the plan schedule to establish the earliest start dates. It is also used to calculate the flow of locations and location-based tasks. The technical lags are used instead when forecasting future problems during the implementation phase or when doing risk analysis and analysis of the probability of interference. The buffer may be absorbed by delay without impacting on the overall project duration.

System 200 thus allows construction activity location scheduling to be performed by providing for external dependencies, location accuracy, internal dependencies, internal to external dependencies, and CPM overrides. In this exemplary embodiment, system 200 allows more effective construction project planning by providing for a location-based planning to be used in conjunction with CPM and other conventional construction planning processes and external logic. In this manner, location lags in the sequencing of external logic can be accommodated. Just as there can be a time lag between activities and CPM, there can be a location lag between tasks in location-based planning.

Internal-external dependency system 208 accommodates location lags in the sequencing of external logic. For example, pouring horizontal concrete in a structure interferes with the formwork of the floor above and with the interior work often two floors below its location due to back propping. It does not affect the same floor, or a higher LBS level (the whole building) so this cannot be modeled using accuracy levels. However this can be modeled using just two location lag links. Formwork is preceded by pouring horizontal concrete with a lag of minus one floor. Interior works are preceded by pouring horizontal concrete with a lag of plus two floors. A negative location lag of one means that a lower location must be finished before starting the succeeding task on the next floor. A positive lag of two floors means that two higher locations must be finished before starting the succeeding tasks on a floor. Location-based lags can work only within a sub-hierarchy of the LBS (e.g. one building) or in all its sub-hierarchies, to avoid examples such as the floors of one building restricting the finishes in the next building.

Figure 14:
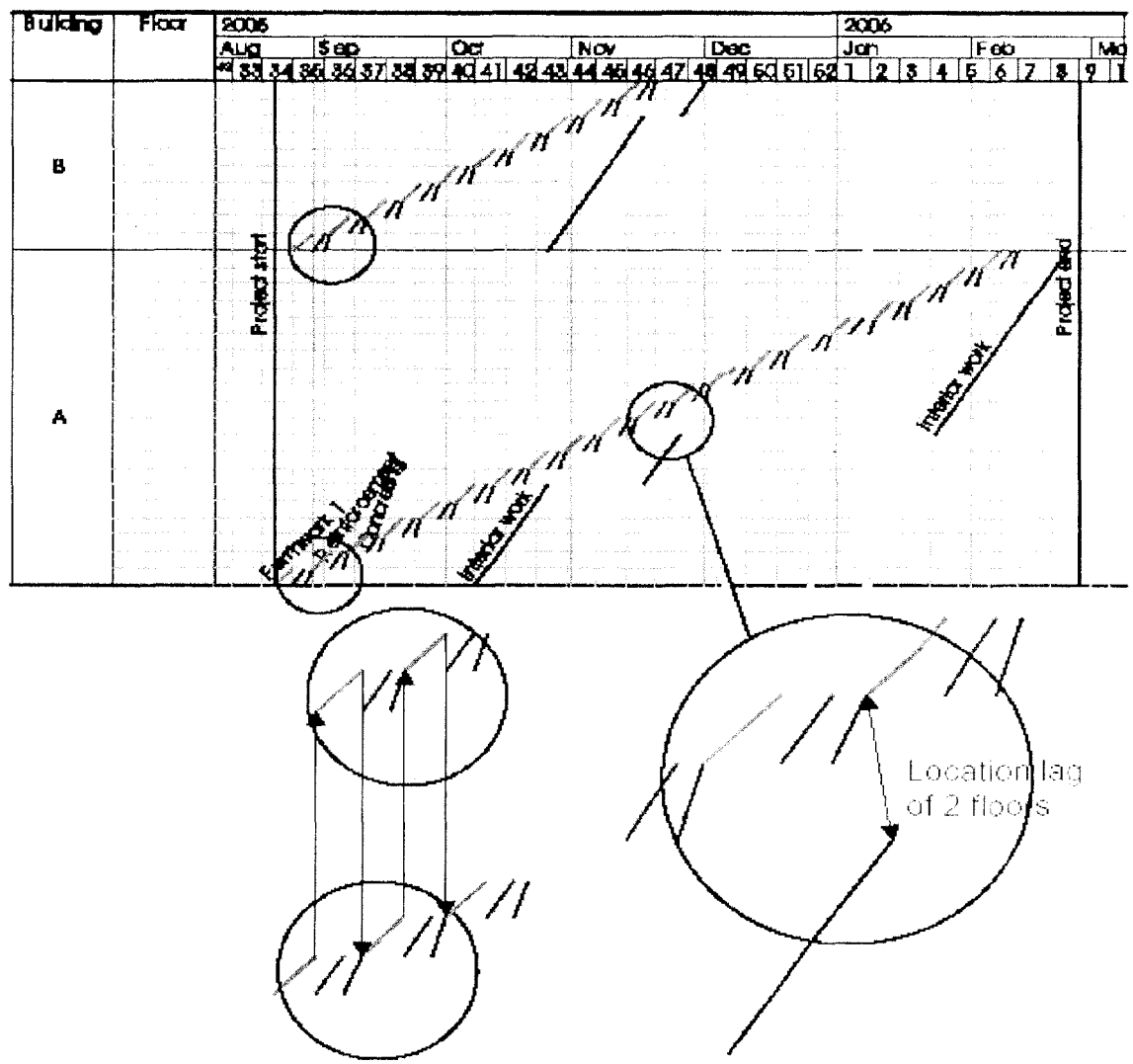

FIG. 14 is an example of two buildings of twenty and ten floors. There are four tasks on each floor: formwork, reinforcement, concrete and interior work. The links are normal location-based except that formwork is preceded by concrete with the lag of minus one floor and interior work by concrete with the lag of two floors. The sequence of locations (internal logic) has been manipulated so that waiting times are minimized. The formwork crew can work in the second building when it would have had to wait in the first building. Interior work 1 has been split into two parts to optimize continuity and duration. Optimizing the internal location sequence of interior work tasks results in six floors being done first in building A and then switching to building B for eight floors, and then the crew goes to building A to finish three more floors and finally finish building B. The crew has a break of eight weeks before coming back to finish building A. The formwork crew can therefore work continuously by working in two buildings. However reinforcement and concreting tasks have waiting time because of their faster production rate.

CPM override system 210 allows standard CPM logic links to be used between any task and any location. If applied internally to the task, the logic supersedes the internal logic of the task, for example, constraining possible sequences. If created between two tasks and two locations, this link type can be used to account for special circumstances such as one part of the LBS affecting other parts of the LBS. This layer is needed to model, for example, links between structures and finishes in complex location breakdown structures with the same LBS used for both structures and finishes (for example in a sports stadium with different LBS branches for each of the structure and functional spaces).

Figure 15:
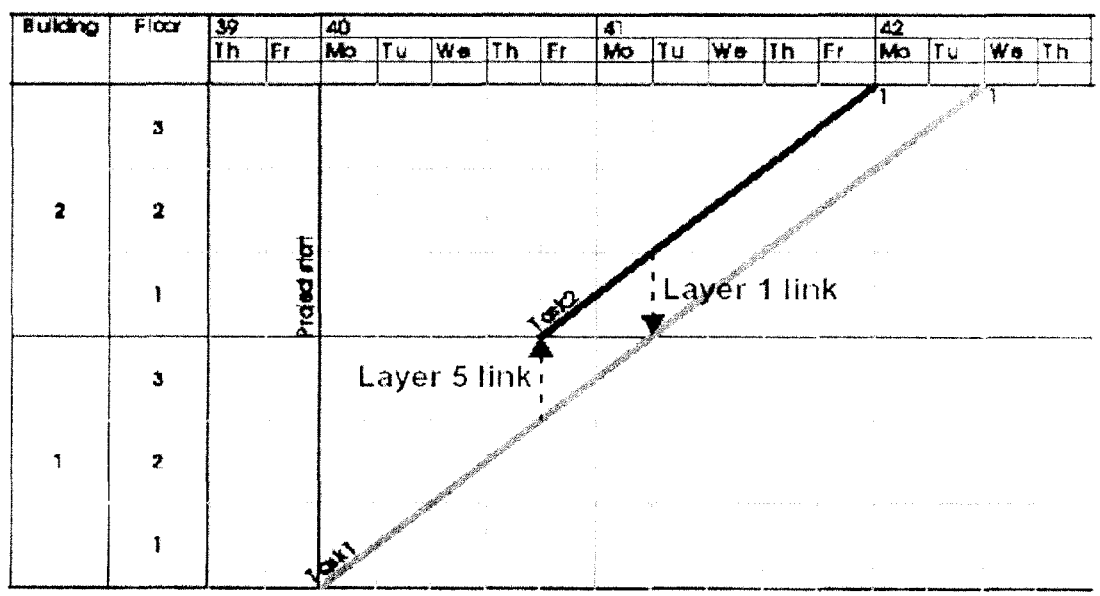
Figure 16:
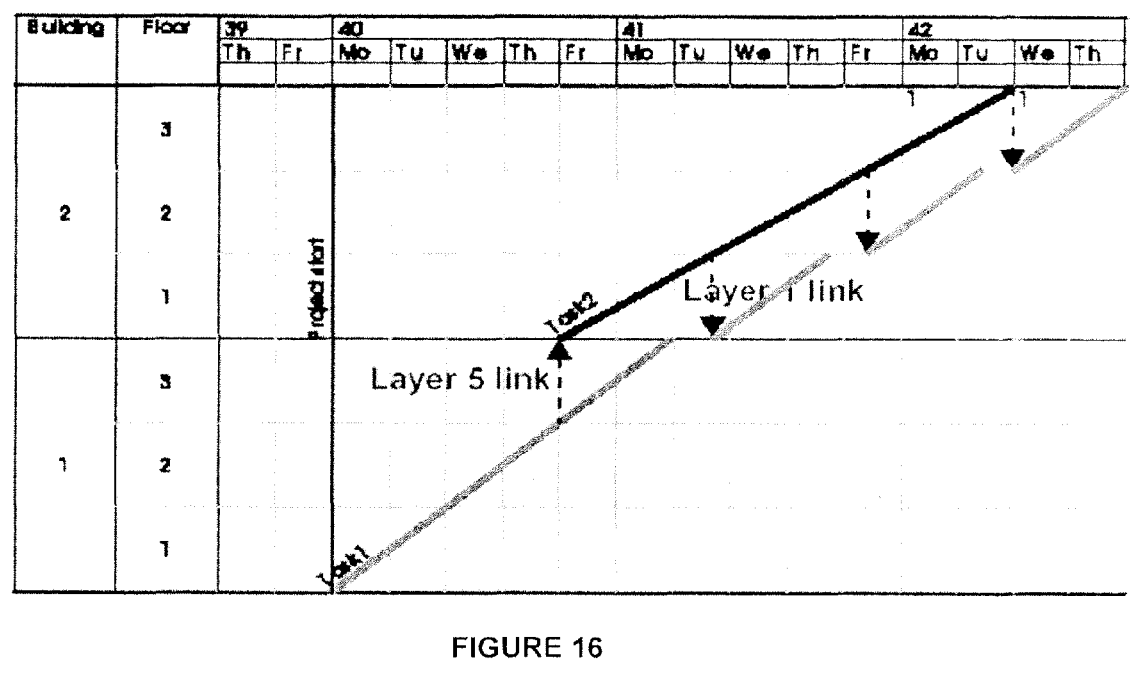

In FIG. 15, task 2's first location 2-1 must follow task location 1-2 (a single location layer five link). There is also a constant layer one link between the tasks such that task 1 must succeed task 2 on every floor. This example illustrates that multiple layers of logic must be able to be active simultaneously. In the special case illustrated above, the relationship between the two tasks in fact becomes circular. This works for this example, however, were task 1 to be slower than task 2, task 2 could not be made continuous, in which case location-based logic takes precedence and thus task 2 will become discontinuous, as shown in FIG. 16. Any attempt to make task 2 continuous would relocate the layer, five link in time with a cascading affect.

In addition to the standard CPM operation of checking for circular logic between location activities, circular logic needs to be checked for location-based tasks. Location-based tasks can have circular logic that does not result in circular logic between location activities. This can easily happen with a combination of layer five logic and other logical layer links. Therefore, ordinary CPM calculations would not be effective, but updating start dates to achieve continuity would cause the problem of updating the other task again, thus breaking continuity. In this case, start dates can be shifted by the continuity heuristic only to the point where the shift does not affect the previous task.

Figure 3:
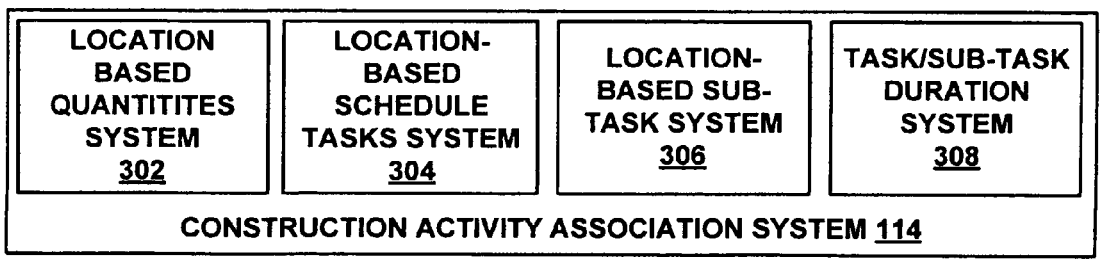
FIG. 3 is a diagram of a construction activity association system in accordance with an exemplary embodiment in the present invention.

FIG. 3 is a diagram of a construction activity association system 114 in accordance with an exemplary embodiment in the present invention. Construction activity association system 114 includes location-based quantity system 302, location-based schedule tasks system 304, location-based subtask system 306, and task/sub-task duration system 308, each of which can be implemented in hardware, software, or a suitable combination of hardware and software, in which can be run on more software systems operating a general purpose processing platform.

System 300 can be implemented using the following set of assumptions for the data processed by system 300:

All the work included in a task will be undertaken by a common resource (which is a property of a location-based task).

The common resources apply the same production or productivity factors for all the items in the task (which is a simplification from real life, where a worker's productivity factor can vary from 1.0 when the worker is performing a task to 0.0 when the worker is cleaning, hauling refuse, or performing other non-value adding activities).

The resource production factors are independent of the item or item quantity.

There is an optimal crew composition for the task.

The resources do all the locations included in the task in sequence (overlapping requires task splitting).

The resources completely finish a location before moving to the next location.

These assumptions require a different methodology of planning and controlling work in new kinds of contracts to support project control. These issues are applicable to the various systems in system 300.

Location-based quantity system 302 provides location-based quantities estimated for the location of any location and any location breakdown structure. These include providing starting data for items by item name, consumption rate in hours per unit, accuracy level, quantity for each location on the accuracy level (note this quantity can be zero which means that the work does not exist in that location) and unit. In this manner, location-based quantity system 302 provides location-based quantities estimated for each of the locations in a location breakdown structure.

Location-based schedule tasks system 304 provides location-based scheduled tasks by name, included quantity items, accuracy level (defined by the roughest accuracy level of the included quantity item), locations (defined by the locations of the included quantity items), and one or more subtasks that contain the location. For example, location-based schedule tasks system 304 can require a planner to identify the location-based schedule tasks and to assign the associated properties for such tasks.

Location-based subtask system 306 identifies subtasks with properties that include locations, a sequence of locations (logic layer three sequence), an optimal crew, the number of optimal crews, production factors of resources in the optimal crew, location difficulty factors, timing option (as soon as possible, as soon as possible and continuous, continuous and manual), targeted start date for use when the task is not as soon as possible, shift length in time units and holiday or days off, logic links to predecessors with the following properties: the predecessor task, the link type (finish-start, start-finish, start-start, finish-finish), the lag (in shifts or time units), the buffer (in shifts), the location accuracy of the link: a layer one link if fine (low) as the rougher of the two tasks accuracies: a layer two link if rougher (higher); or if layer five link, specify that the link is between individual locations; for layer four link, the location lag if not equal to zero, and for layer four links does the link apply only in the same branch of the location breakdown structure.

Task/sub-task duration system 308 determines the duration for a task or sub-task for use in location-based scheduling. The duration of shifts in each location may be calculated based on quantities and crews selected using the following exemplary steps. First, the quantity of man-hours needed to complete the task or sub-task at the location is calculated. Next, the result is divided by the sum of the production factors of the selected resources to obtain the duration for the task in hours. The duration of the task is divided by the shift length to get the duration in shifts for the task, which can then be adjusted based on a difficulty factor. It should be noted that the duration of a CPM activity may be manipulated by changing properties of a location-based task, such as quantities, productivities, or durations.

The CPM model may therefore be calculated from the location-based heuristics by performing the following steps:

Calculate the durations of each location of each task based on quantities, resources and productivities Create the activity network from location-based links Layer 1 links: create a link of the same type between the locations shared by both tasks.

Layer 2 links: the link will affect either the first or last location within the sequence of locations at the tasks own accuracy level because the task will always have a more accurate location breakdown than the accuracy level of the link, F-S: create a F-S link between the last location of the predecessor within the link's level of accuracy and the first location of the successor within the link's level of accuracy.

S-S: create a S-S link between the first location of the predecessor within the link's level of accuracy and the first location of the successor within the link's level of accuracy.

S-F: create a S-F link between the first location of the predecessor within the link's level of accuracy and the last location of the successor within the link's level of accuracy.

F-F: create a F-F link between the last location of the predecessor within the link's level of accuracy and the last location of the successor within the link's level of accuracy.

Layer 3 links: create a F-S link between the location of the same sub-task in the location sequence.

Layer 4 links: create a link of the same type between locations shared by both tasks, offset by as many locations as indicated by the location lag. When calculating the offset, the predecessor's location sequence is used. If the link applies only in the same section of the LBS, disregard any links between locations of different LBS sections.

Layer 5 links are already between single locations so no further action needs to be taken.

Calculate the forward pass of the schedule

Sort location-based tasks to precedence order so that all locations of the predecessors of a location-based task (in any location) are before any location of the task, unless layer 4 or 5 logic creates circular location-based logic.

In the case of circular location-based logic, the locations are sorted so that the layer 1, 2 or 4 predecessor's locations are added first to the sort, until the first location that depends on a successor task's start date. Then the successor start dates are calculated until the predecessor's uncalculated start dates are needed to calculate a location's start date.

For each task (or task part) in the sorted order, calculate earliest start using normal CPM calculations both using layer 3 links and disregarding layer 3 links. If desired, do sequence optimization by changing the sequence so that locations are done in sequence of ascending earliest start order (disregarding layer 3 links).

Adjust the start dates of locations based on the selected timing option to force continuity. Record start and finish dates for each task and location activity, and calculate the backward pass of the schedule. Use normal COM calculations except for the following:

Total float uses the buffer lag instead of the technical lag.

Free float disregards layer 3 links.

Record total float, free float and criticality for each task and location activity.

Figure 4:
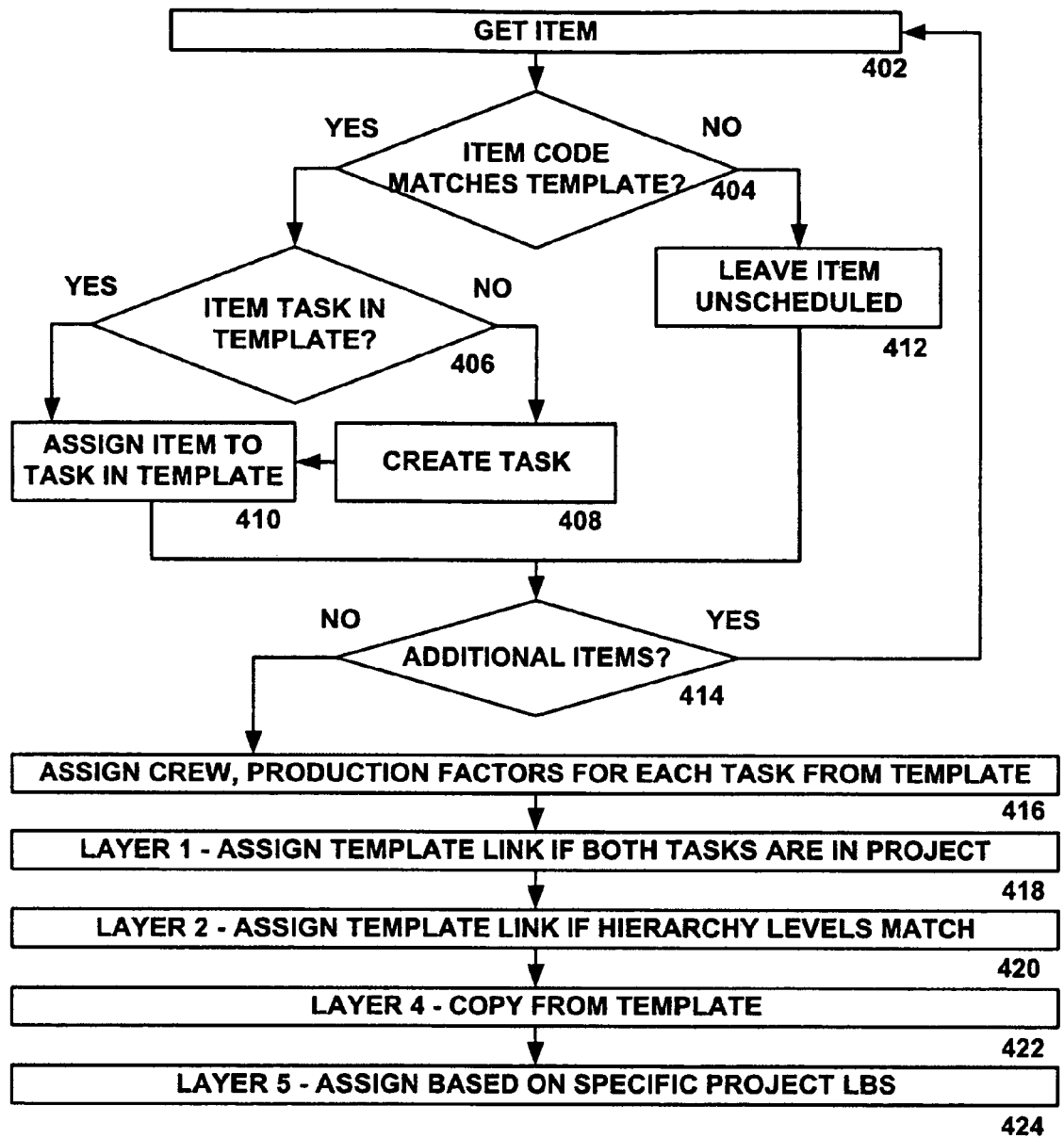
FIG. 4 is a flow chart of a method for automating schedule creation in accordance with an exemplary embodiment of the present invention.

FIG. 4 is a flow chart of a method 400 for automating schedule creation in accordance with an exemplary embodiment of the present invention. The creation of location-based task can be automated by defining the quantity items that are usually produced together in a standard project. This can be practically implemented by using the quantity item code in the bill of quantities as an identifier and lumping the quantities together in the same way as in a standardized template project. For the duration calculation, the same crews as used in the template project can be adopted. The resulting schedule may be created using the following method.

At 402, a quantity item is retrieved from a quantity item repository or database. The method then proceeds to 404 where it is determined whether the quantity item code matches the template quantity item code. It is determined that the quantity item code does match, the method proceeds to 406 where it is determined whether a quantity item task is in the template. If it is determined that a quantity item task is not in the template the method proceeds to 408 wherein a new task is created. The method then proceeds to 410. Likewise, if it is determined that a quantity item task is in the template at 406 the method proceeds directly to 410.

At 410 the item is assigned to the task in a template. For example, each task should have a corresponding task in the template. If one has not been created, it is created at set 408. The method then proceeds to 414.

Likewise, if it is determined in 404 that the item code does not match an item code and template the method proceeds to 412 and the item is left in the schedule. The method then proceeds to 414.

Method 414 is determined whether there are additional items for processing. Additional items remain in the database or are otherwise required for processing the method returns to 402. Otherwise, the method proceeds to 416.

At 416, all scheduled tasks are processed. The optimal crew from a template and the same production factors are assigned to each task. Then the method proceeds to 418.

At 418, precedence links that are found in the template of both tasks that exist in the current project are processed. For example, layer 1 tasks are assigned the template link if both tasks are in the project. After all tasks have been processed, the method proceeds to 420.

At 420, all layer 2 template links are assigned if the hierarchy for the tasks matches the hierarchy level in the template. For example, each template task may have a predetermined hierarchy level. For each task, it is determined whether similar hierarchy levels exist. If similar hierarchy levels exist then the template links are assigned between tasks. The method then proceeds to 422.

Note that for layer 3 links, there is no need to copy any layer 3 links from a template because these links are internal to the task. Thus, at 422 the layer 4 links are copied from the template for each task, and can include linking of tasks based on duration to ensure continuity. Linking can include the shifting of start dates to provide continuity if the initial calculations result in a discontinuous schedule, as well as manipulation of the duration of all CPM activities with a location-based task by changing the properties of the location-based task, such as quantities, productivities or durations. The method then proceeds to 424.

At 424, layer 5 links are assigned based on projects specific location base structure. For example, although automation of schedule creation has largely been accomplished through method 400, any projects specific tasks for layer 5 links must be assigned manually. The method then terminates.

In operation, method 400 allows for automation of a location-based plan system. There are only minor differences between projects of the same general type (residential, retail, etc.) that mainly apply to the location breakdown structure and the quantities of work in each location. Otherwise, optimum crews, productivities, and precedence relationships are often remarkably similar. Therefore, it is possible to automate the work that is involved in the scheduling of a project, to create rapid initial drafts of a schedule project based on standardized packages of tasks, crews and precedence relationships that may be combined with a project specific location breakdown structure, quantities, and productivities.

In this manner, every project does not have to be created as an individual and different project and uniquely scheduled. Scheduling of most projects can be processed in a similar manner, such that information from past projects can be reused by entry of such information in two templates.

FIG. 5 is a diagram of a system 500 for modeling production system risk in accordance with an exemplary embodiment of the present invention. System 500 includes production risk system 110 and Monte Carlo simulation system 502, weather risk modeling system 504, prerequisite risk modeling system 506, resource modification risk system 508, productivity rate risk system 510, material availability risk system 512, resource availability risk system 514, location risk modeling system 513, and quality risk modeling system 518, each of which can be implemented in hardware, software, or a suitable combination of hardware and software, and which can be one or more software systems operating on a general purpose processing platform.

Monte Carlo simulation system 502 utilizes the location-based construction planning system model and risk modeling systems of system 500 to perform a Monte Carlo simulation analysis of a location-based construction model. In one exemplary embodiment, Monte Carlo simulation system 502 performs a large number of iterations utilizing randomly selected parameter values based on statistical data associated with tasks, crew performance, resources, material availability, and other variables in a location-based construction model. In this manner, the effect of random variations in parameters affecting a construction scheduling model for a large number of tasks, including modeling of construction crews, can be accurately modeled so as to generate a risk probability distribution for construction completion, costs, and other items that have been modeled as fixed entities in the prior art but which in reality will have a statistical distribution based on a large number of variables, such as the behavior of individual construction crews. Monte Carlo simulation system 502 can use probability distributions to model uncertainties, the production system cost model to evaluate any cost effects of risk, and planned logic to evaluate the effects of deviations in production on other tasks. Monte Carlo simulation system 502 provides an aggregate outcome of from the simulation to estimate the risk inherent in the project schedule. For example, it may be determined that a shorter schedule has a risk distribution that results in a greater chance of delay exceeding a predetermined time than a longer schedule that is more flexible and which can accommodate more contingencies. Alternatively it may be determined that the saving of overhead costs by compressing the schedule may be offset by increased costs of waiting in a shorter schedule.

Weather risk modeling system 504 provides statistical models for deviations in construction projects based on variations such as resource trade, task, or other variables. In one exemplary embodiment, weather effects are modeled using a daily, weekly or monthly probability for different kinds of bad or good weather. The effects of catastrophic events such as hurricanes, ice storms, extended power outages or blizzards can also be modeled. Each task can have one or more defined weather effects on task parameters. For example, work can stop or productivity can decrease or increase by a given percentage for each day. If bad or good weather occurs, the associated parameters such as productivity for all tasks affected by the weather type in question are adjusted. Although most environmental risks can be ignored using a location-based management system, weather can be modeled in that it affects specific trades and specific locations. The amount of the affect may differ, and data recording of weather conditions can also be used as part of the control monitoring system.

Prerequisite risk modeling system 506 models risks related to events that must be completed before a task can begin in a location. Prerequisites include such events as procurement, deliveries, the availability of resources and completion of design. Prerequisite risks can be modeled by a probability distribution around the planned completion date for the prerequisite, where the task start date parameter is delayed until after all its prerequisites are completed. Other suitable models or parameters can also or alternatively be used.

Resource modification system 508 models risks arising from a mobilization on site, such as because of new work starting, an increase in resource needs, because the work was discontinuous, or due to other causes which may result in resources not being available when needed. For example, if resources have left the work site, a modification in the parameter for restarting work due to return delay of a period of one or two weeks can be used to determine overall schedule delay. These risks can be modeled by two distribution types, in one exemplary embodiment. The first model is to model the risk like a prerequisite, which and can be modeled in the same way for each point where resources are added to the task. The second approach is to model return delay distributions when the resources run out of work and are forced to leave the site. Other suitable models can also or alternatively be used.

Productivity rate risk system 510 models productivity rates which are used in planning schedules to account for individual differences in productivity rates due to parameters such as learning rates as a function of work ease or difficulty, or other crew and individual characteristics. In one exemplary embodiment, each crew can have its own historical or estimated productivity distribution. In duration calculations this simulated crew productivity is used to calculate duration in each location. Thus crew productivity can be used to set a trend of production rate around which there may be independent location-based variation due to weather, quantities or other location-based factors, or other suitable models can be used.

Material quantity risks system 512 models risks due to changes between planned quantities and actual quantities, such as due to change orders, mistakes in the quantity take-off, of other factors. Each task can include a modeled quantity distribution around the expected quantity which has been used in planning. This simulated quantity can be used to calculate durations in Monte Carlo simulation, or to otherwise account for material availability risks on parameters such as productivity, start date, or completion date.

Resource availability risk system 514 models risk arising from planned resources being or becoming available on parameters such as productivity, start date, or completion date. For example, the subcontractor may not have enough men or might have more critical projects with higher penalties for delay at the time when the task commences, such as where applying too few resources will lead to production rate deviation. In another exemplary embodiment, a sub-contractor may not have enough work elsewhere and may seek to locate too many resources on the site, leading to discontinuous work due to the task pace being faster than the planned rate. In one exemplary embodiment, resource availability can be modeled as the maximum number of crews available for each subcontractor between minimum, expected and maximum numbers. Likewise, other suitable factors can also be modeled, such as whether the location is a remote location.

Location risk modeling system 516 models other miscellaneous uncertainty factors affecting parameters. For example, this model can be used to represent uncertainty related to the difficulty of performing work at the location, probability of design changes at the location, or to address other factors. Location distributions can also be modeled as being independent of each other, related based on commonality of resources, and other quality effects on other suitable parameters relating to productivity, start date, or completion date can also or alternatively be modeled.

Quality risk modeling system 518 models risk resulting from quality errors, which can result in rework effecting the workers doing the work, rework by multiple trades later in the project, or at worst, large schedule deviations. In one exemplary embodiment, each trade is assigned a simulated quality production ability that defines the probability that the quality of workmanship for a task or in a location is satisfactory. For each location, quality is simulated with a result of satisfactory or unsatisfactory. If a quality check has been planned for the location before the next trade comes in, it can be assumed that poor quality work will be immediately identified, with rework only for the original sub contractor. Otherwise, each successor in the activity chain can be assigned a probability of noticing the quality defect. The amount of rework needed in a location is defined by how many trades worked in the location without noticing the defect. Rework time is a distribution between zero and the total original duration of all the effected tasks. Other quality effects on other suitable parameters relating to productivity, start date, or completion date can also or alternatively be modeled.

In operation, system 500 provides the statistical models for performing a Monte Carlo simulation of a location-based construction planning model. System 500 allows a planner to obtain a realistic estimate of construction costs and schedule based on known statistically variant components of the location-based construction model.

FIG. 6 is a flow chart of a method 600 for performing a Monte Carlo simulation for modeling location-based construction planning model risks in accordance with an exemplary embodiment of the present invention. Method 600 begins at 602 where the start date distributions for each task part are sampled. In one exemplary embodiment, each task can have a start date that varies as a statistically distributed range. At the beginning of each Monte Carlo simulation, the start date for each task part is sampled randomly. The method then proceeds to 604.

At 604, the resource start distribution for each crew is sampled. In one exemplary embodiment, resource start distributions for crews can have statistical distributions, where a random selection is made for each crew's resource start. The method then proceeds to 606.

At 606, the productivity distribution for each planned resource is sampled. In one exemplary embodiment, the productivity for a resource can have a statistical model, such that the statistically determined productivity distribution is sampled for each resource. The method then proceeds to 608.

At 608 the duration distribution for each location of each task is sampled. In one exemplary embodiment, each task can have a statistically variant duration, such that the Monte Carlo simulation will use a sample for each location and each task to modify its duration based on miscellaneous factors that are not functions of resource productivity or quantity. The method then proceeds to 610.

At 610 the tasks are sorted into precedence order. In one exemplary embodiment, all predecessors are sorted prior to successor tasks, such as where a task must be performed prior to another task. The method then proceeds to 612.

At 612, any circular location-based logic corrected. In the case of circular location-based logic because of new dependencies, the locations are sorted so that the predecessors locations having just ordinary dependencies (no location lags) are added first to the sort, until the first location is identified that depends on a successor's task start date. The successor's start dates are then calculated until the predecessor's uncalculated start dates are needed to calculate a location's start date. The method then proceeds to 614.

At 614 the task or task parts are calculated in sorted sequence. In one exemplary embodiment, this can be performed by first going through locations in the following planned location sequence.

The start date of each a location is set to the maximum of the start date distribution, the resource start distribution of first crew, or the earliest start date defined by preceding activities (excluding buffers).

The total productivity is determined as a function of time, which value is the sum of simulated productivity multipliers of different resources applied to the task, starting at different simulated times.

The productivity of a resource is zero while beginning or finishing task (mobilization/demobilization). The mobilization/demobilization productivity loss is also applied when resources leave and come back to the work site because of a disturbance.

The duration of a location is the point where time integral of the total productivity function reaches the amount of work needed to complete the planned quantities.

The finish date of a location equals the maximum of the start date plus task duration or the dependencies (excluding the buffer).

If the start date of the next location is greater than the finish date of preceding location and the resources wait, then the waiting cost is calculated and the disturbance is recorded. Waiting cost is determined by multiplying the hourly rate of waiting resources times the number of hours, days or other units of time spent waiting before the next location becomes available. If start date of next location is greater than the finish date of the preceding location and the resources leave, the mobilization and demobilization cost is calculated, the return distribution is sampled, and the disturbance is recorded. The mobilization and demobilization cost is the hourly rate of mobilizing or demobilizing resources times the hours wasted mobilizing or demobilizing for each resource.

If the resources leave, then the start date of next location is set to the maximum of earliest start allowed by the preceding tasks plus a simulated return delay.

If the resources do not leave but wait, then the start date of next location is set to the maximum of the finish date of preceding location and the earliest start allowed by the preceding tasks.

If the location finishes late or early from the scheduled finish, a modeled control action can be simulated (such as where an early or/and late trigger set by user). In one exemplary embodiment, the control action model can calculate how many new crews are needed (or how many old crews can be released) for next locations to finish the task on time. For these new resources, the start date distribution is sampled and productivity is lost during mobilization time (i.e. they do not start immediately). If the number of crews that are required is less than one unit or a resource constraint prevents increasing the number of crews, the control action can be canceled.

The process then moves to the next uncalculated task part or stop, and the method then proceeds to 616.

At 616, the costs associated with the simulated location-based model are calculated. In one exemplary embodiment, the overhead costs, total waiting costs, working costs, and cost of moving around can be calculated. Likewise, other suitable costs can be calculated. The method proceeds to 618.

At 618, the simulated dates of milestones and end date are calculated. In one exemplary embodiment, a simulated time of milestones that were previously identified can be calculated. The method then returns to 602 for each Monte Carlo simulation calculation.

In operation, method 600 allows a statistical distribution of construction costs and times to be calculated to allow planners to obtain a realistic assessment of the risks for a given location-based construction planning model. For example, by shortening the model length of time for a construction project, the risk of delays and other contingencies may increase, such that a more reasonable approach could be determined that a later construction plan end date will result in a greater chance of completion by the end date than an earlier construction end date.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A method for modeling construction risk comprising:
providing a statistical model for each of a plurality of location-based tasks of a construction project model, wherein one of a plurality of work crews performs an associated one of each of the plurality of location-based tasks, wherein one of a plurality of first statistical models is related to a corresponding one of the plurality of work crews, and one of a plurality of second statistical models is related to a corresponding one location variable of each location-based task;
randomly selecting a model parameter for each of the plurality of first statistical models and each of the plurality of second statistical models to generate a statistically-based duration for each of the location-based tasks;
calculating a schedule duration based on the statistically-based durations of the location-based tasks; and
repeating the steps of providing, randomly selecting, and calculating until a statistical distribution for the construction project model is generated.

2. The method of claim 1 wherein calculating a schedule duration comprises setting a start date for a location-based task equal to the maximum of the group comprising a start date distribution and an earliest start date defined by preceding activities.

3. The method of claim 1 wherein calculating a schedule duration comprises determining a duration for a task by determining when a time integral of a total productivity function equals an amount of work required to complete the task.

4. The method of claim 1 wherein calculating a schedule duration comprises adding a delay to a start time for a task if a resource has left a job site associated with the task.

5. The method of claim 1 wherein calculating a schedule duration comprises adding a delay to a finish time for a task based on weather data.

6. The method of claim 1 wherein calculating a schedule duration comprises adding a delay to a finish time for a task based on modification of resources required for the task.

7. The method of claim 1 wherein calculating a schedule duration comprises adding a delay to a finish time for a task based on modification of productivity rates for workers performing the task.

8. The method of claim 1 wherein calculating a schedule duration comprises adding a delay to a finish time for a task based on rework required due to poor quality of workmanship for the task.

9. A system for modeling construction risk comprising:
- A construction task modeling system configured to store a model having one or more parameters for each of a plurality of location-based tasks and a plurality of work crews, wherein one of the plurality of works crews performs an associated one of each of the plurality of location-based tasks, wherein one of a plurality of first statistical models is related to a corresponding one of the plurality of work crews, and one of a plurality of second statistical models is related to a corresponding one location variable of each location-based task;
- A production risk system configured to store one or more risk models configured to generate a value for each of the one or more parameters of the plurally of location-based tasks and the plurality of work crews based on an input using one or more of the first statistical models and the second statistical models; and
- A Monte Carlo simulation system configured to iteratively randomly select a model parameter for the first statistical models and the second statistical models to generate a statistically-based duration for each of the location-based tasks.

10. The system of claim 9 wherein the production risk system includes a weather risk modeling system generating a value for one or more parameters based on an affect of weather on the parameter.

11. The system of claim 9 wherein the production risk system includes a prerequisite risk modeling system generating a value for one or more parameters based on an affect of a prerequisite on the parameter.

12. The system of claim 9 wherein the production risk system includes a resource modification risk system generating a value for one or more parameters based on an affect of a modification of one or more resource on the parameter.

13. The system of claim 9 wherein the production risk system includes a productivity rate risk system generating a value for one or more parameters based on an affect of a productivity rate on the parameter.

14. The system of claim 9 wherein the production risk system includes a material availability risk system generating a value for one or more parameters based on an affect of an availability of a material on the parameter.

15. The system of claim 9 wherein the production risk system includes a resource availability risk system generating a value for one or more parameters based on an affect of an availability of a resource on the parameter.

16. The system of claim 9 wherein the production risk system includes a location risk modeling system generating a value for one or more parameters based on an affect of a location in which a task is performed on the parameter.

17. The system of claim 9 wherein the production risk system includes a quality risk modeling system generating a value for one or more parameters based on an affect of a quality of work for a task on the parameter.

18. A system for modeling construction risk comprising:
- A construction task modeling system configured to store one or more parameters for each of a plurality of location-based tasks wherein one of a plurality of first statistical models is related to a corresponding one of each location-based task;
- A productivity rate risk system configured to store one or more parameters for each of a plurality of individual construction crews, wherein one of a plurality of second statistical models is related to a corresponding one of the plurality of construction crews; and
- A Monte Carlo simulation system configured to iteratively randomly select a parameter for the first statistical models and the second statistical models to generate a statistically-based duration for each of the location-based tasks.

19. The system of claim 18 further comprising a weather risk modeling system storing one or more parameters for an affect of weather on the individual construction crews.

20. The system of claim 18 further comprising a quality risk modeling system storing one or more parameters for a quality of work associated with one or more of the location-based tasks and with one or more of the individual construction crews.

* * * * *

UNITED STATES PATENT AND TRADEMARK OFFICE
CERTIFICATE OF CORRECTION

| | | |
|---|---|---|
| PATENT NO. | : 7,752,020 B2 | Page 1 of 1 |
| APPLICATION NO. | : 11/502690 | |
| DATED | : July 6, 2010 | |
| INVENTOR(S) | : Olli Pentti Petteri Seppanen et al. | |

It is certified that error appears in the above-identified patent and that said Letters Patent is hereby corrected as shown below:

Col. 21, line 7, please delete "poor."

Signed and Sealed this
Fifth Day of April, 2011

David J. Kappos
*Director of the United States Patent and Trademark Office*